Aug. 2, 1960   J. K. LEVIN ET AL   2,947,090
CODE-TEACHING APPARATUS
Filed Nov. 10, 1958   2 Sheets-Sheet 1
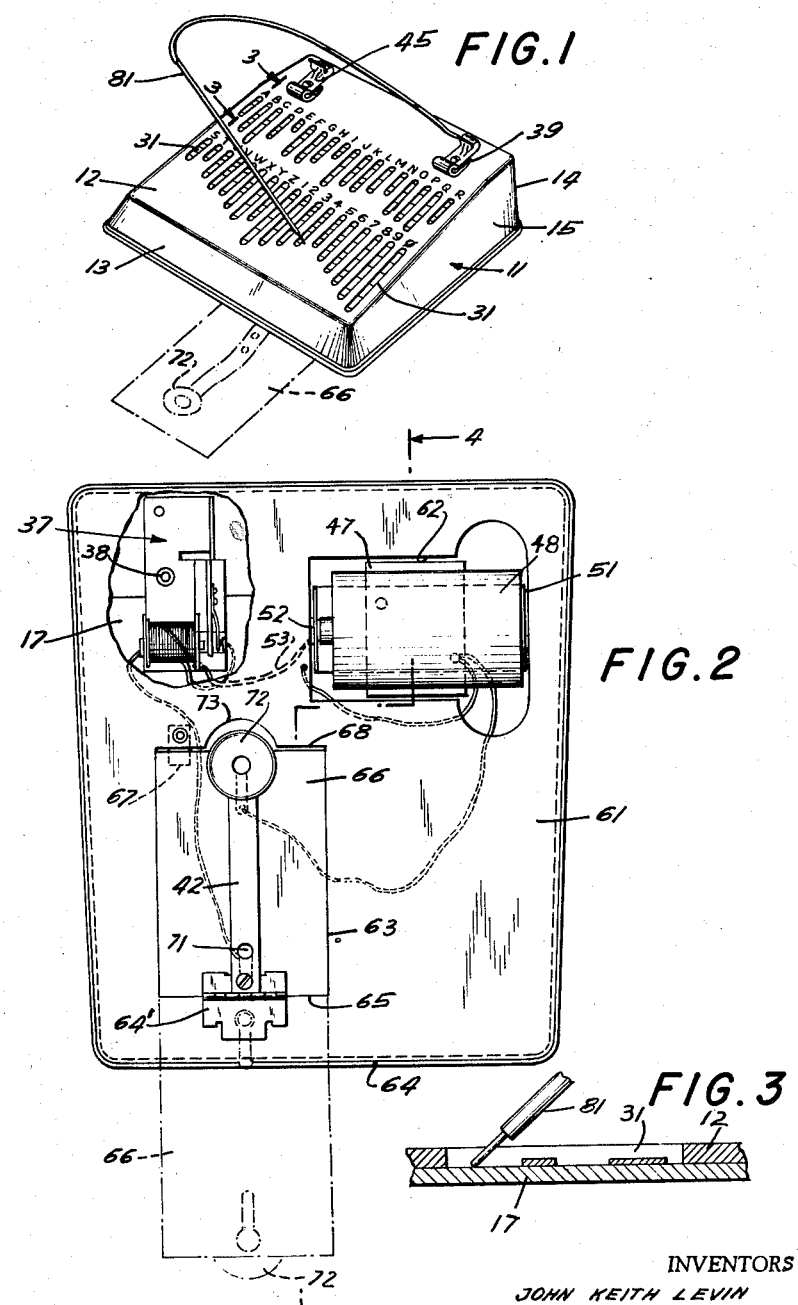
INVENTORS
JOHN KEITH LEVIN
WILLIS G. STEWART
BY
Dean, Fairbank & Hirsch
ATTORNEYS Aug. 2, 1960    J. K. LEVIN ET AL    2,947,090
CODE-TEACHING APPARATUS
Filed Nov. 10, 1958    2 Sheets-Sheet 2
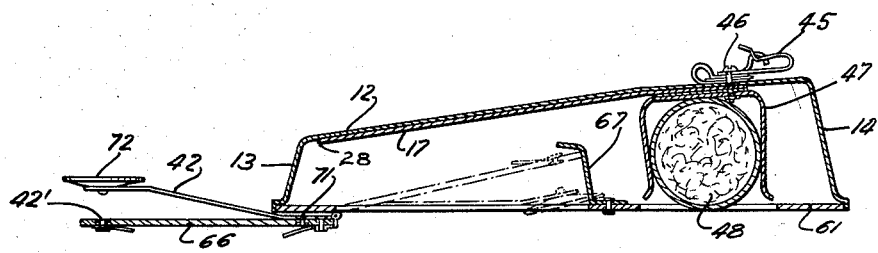
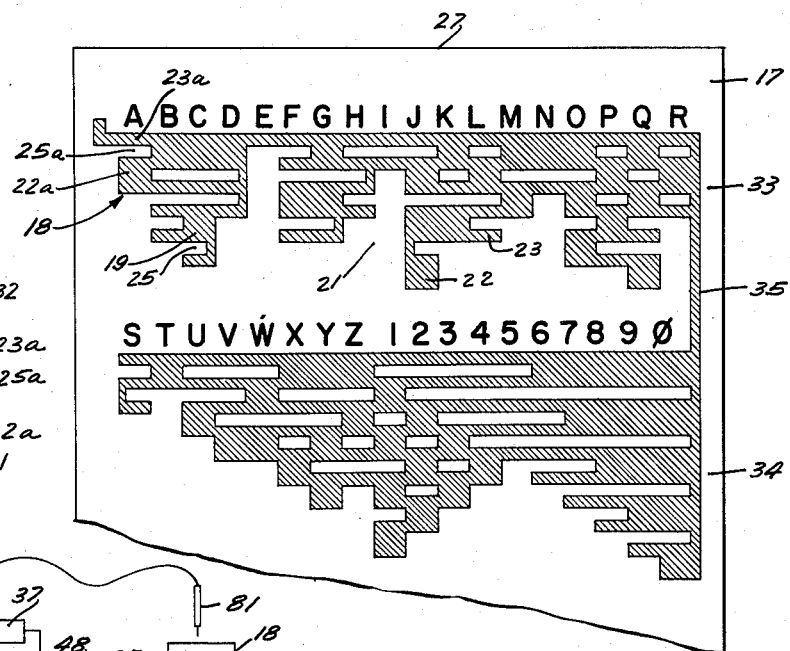
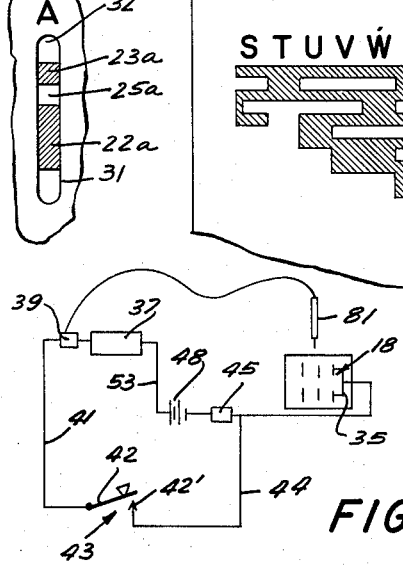
INVENTORS
JOHN KEITH LEVIN
WILLIS G. STEWART
BY
ATTORNEYS

United States Patent Office 2,947,090
Patented Aug. 2, 1960

2,947,090

CODE-TEACHING APPARATUS

John Keith Levin, New Bedford, Mass., and Willis G. Stewart, Portsmouth, R.I., assignors to Aerovox Corporation, a corporation of Massachusetts Filed Nov. 10, 1958, Ser. No. 772,908

5 Claims. (Cl. 35—14)

This invention relates to the art of code teaching apparatus and more particularly to a device for teaching Morse code.

It is among the objects of the invention to provide a code teaching device that is compact in size, light in weight and may readily be fabricated at low cost from relatively inexpensive materials, that may be used by a student to reproduce audible code symbols that are maintained in properly spaced sequence and which serve as a guide for the student so that he may have practice in recognizing the code symbols and which also enables the student manually to reproduce the individual code symbols.

According to the invention, these objects are accomplished by the arrangement and combination of elements hereinafter described and particularly recited in the claims.

This application is a continuation-in-part of copending application Serial No. 615,403, filed October 11, 1956, now abandoned.

In the accompanying drawings in which are shown one or more of various possible embodiments of the several features of the invention, Fig. 1 is a perspective view of the unit, Fig. 2 is a bottom plan view thereof with parts broken away, Fig. 3 is a sectional view on an enlarged scale taken along line 3—3 of Fig. 1, Fig. 4 is a sectional view taken along line 4—4 of Fig. 2, Fig. 5 is a fragmentary plan view of an insulating base having a predetermined continuous pattern of conductive material thereon, Fig. 6 is a detail view on a greatly enlarged scale showing one of the slots exposing a sequence of conductive material and, Fig. 7 is a circuit diagram of the unit.

Referring now to the drawings, the unit comprises a casing 11 of insulating material which has a rectangular top wall 12 with depending front, rear and side walls 13, 14 and 15, the front wall 13 being of height less than that of the rear wall 14 so that the top wall will slope downwardly as shown.

Affixed to the undersurface of the top wall 12 of the casing 11 is a substantially rectangular flat plate 17 of insulating material which may be a laminated phenolic board having disposed on its surface a predetermined pattern 18 of conductive material 19 and exposing the area 21 of the insulating base 17.

The conductive material 19 is preferably a thin layer of copper which has been deposited upon the plate 17 and a portion of which has been etched away by conventional procedures well known to the art to form the desired sequence of conducting and insulated layers. In the drawings, the conducting areas are cross-hatched for metal, while the insulating areas are shown in white. The conducting areas are of two distinct types, that is, the relatively wide strips extending vertically as shown in Fig. 5, such as 22, which correspond to dashes, and the relatively narrow strips 23, which are, say, one-third the width of the wide strips and which correspond to dots. The conducting strips are separated by insulating strips, such as 25, which are the same width as the narrow strips 23 and which correspond to the spaces between the dots and dashes of the code symbols. In practice, a convenient width for the wide strips 22 is 9/16 of an inch and that of the narrow strips 23 and the insulating strips 25 is 3/16 of an inch.

For example, referring to Fig. 5, the letter A would be represented by a narrow metal strip 23a having vertically below it a narrow strip 25a of insulating material which has directly below it a wide metal strip 22a. The pattern 18 is so arranged that sequences of the wide metal strips 22 and the narrow metal strips 23 are arranged in vertical lines between the top 27 and the bottom 28 of the plate 17 so that they correspond to the dots and dashes used to represent the various letters and numerals of the code.

As shown in Fig. 1, the top wall 12 of the casing has a plurality of elongated parallel slots 31 illustratively arranged in two rows, each of the slots being aligned with sequences of the pattern 18 associated with distinct letters and numerals, which sequences are exposed through the respective slots 31.

As shown in Fig. 6, each of the slots 31 is preferably of greater length than the sequence of strips exposed therethrough so as to provide a starting position 32 at the upper end thereof which exposes the insulating material of the plate 17.

As appears from Fig. 5, the various conducting strips exposed through the respective slots 31 shown in Fig. 6, are all connected in a continuous design so that each portion of the metal pattern 18 is in electrical connection with every other portion and the two sections 33, 34 of the pattern are connected by a strip 35.

In order to provide a sound corresponding to a particular code letter or number, a buzzer 37 is secured by a screw 38 to the undersurface of the top wall 12, said screw mounting a terminal 39 on the upper surface of said top wall and being electrically connected to one side of the buzzer and also by lead 41 to the movable arm 42 of a key 43. The fixed contact 42′ of the key is connected by lead 44 to strip 35 of the pattern 18 and to a terminal 45 secured to the top wall 12 as by screw 46 and in electrical contact with a spring clamp mount 47 for a battery 48, the clamp mount being secured to the undersurface of said top wall.

One end of the battery 48 is in electrical connection with the clamp mount as at 51 and the other end of the battery is in engagement with a terminal 52 insulated from the clamp mount and connected by lead 53 to the other side of the buzzer.

In the embodiment shown, the casing 11 has a base cover plate 61 secured to the lower edges of walls 13, 14 and 15 as shown in Fig. 4. The plate 61 has a cut out 62 aligned with the battery clamp mount 47 to permit ready replacement of the battery 48.

In addition, the cover plate has a substantially rectangular cut out 63 extending from near the front edge 64 thereof. Pivotally mounted as by a hinge 64′ to the front edge 65 of the cut out 63 is a plate 66 also of insulating material and of dimensions such that it may pivot about its hinge 64′ into said cut out 63, a stop member 67 secured to the bottom plate 61 adjacent the inner edge 68 of cut out 63 restraining the inward movement of the plate 66.

Secured as by rivet 71 adjacent hinge 64′ to the outer surface of the plate 66 and extending the length thereof is a resilient metal strip which defines the movable arm 42 of the key, said strip 42 being bent outwardly from the secured end thereof. The free end of the strip mounts a circular knob 72 which is positioned directly over the fixed contact 42' illustratively a rivet secured to the plate so that upon depression of the arm 42 by the knob 72 a circuit will be completed to the buzzer 37.

The inner edge 68 of the cut out 63 desirably has a semi-circular cut out 73 to provide clearance for the knob 72 when the plate is positioned in the cut out 63 against stop 67. In this position the key will be completely inwardly of the plane of the cover plate 61 so that the unit may rest on a smooth surface.

In operation of the unit with the stylus 81 connected to terminal 39, to produce the sound of the desired code letter or number, the stylus need merely be inserted into the upper end of the desired slot and moved therealong. As the stylus is moved, it will successively engage the conductive strips and the insulating portion therebetween to intermittently make and break the circuit from the battery to the buzzer to produce the sequence of long and short impulses corresponding to the dots and dashes of the particular code symbol.

Thus, when the stylus contacts a conducting strip such as 22, 23 on the plate 17 it completes a circuit from the terminal 39 through buzzer 37, lead 53 to one side of the battery 48 and from the other side of the battery through terminal 45 to the conducting pattern 18 engaged by the stylus.

Thus, the student using the apparatus herein described is able to associate a particular combination of long and short sounds representing dots and dashes with a letter of the alphabet since each of the slots 31 has printed, adjacent its starting end, the particular indicia to which the code sequence exposed through the slot corresponds. By passing the stylus 81 along any slot 31 at a reasonably constant rate, the student will produce a sound in which the relative lengths of the dots and dashes are correct and at correct intervals for code sending practice.

Where the student desires to practice the sending of code signals, he need merely pivot the plate 66 outwardly so that it rests on a table, for example as shown in Fig. 1 and then operate the key 43 in conventional manner.

Thus, by first using the stylus, the student will acquaint himself with the proper sound of the selected letter or number and then may reproduce such sound by means of the key 43.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. Apparatus for teaching a code utilizing dots and dashes, comprising a hollow casing of insulating material having a top wall, a plate of insulating material secured to the undersurface of said top wall, said plate having a predetermined continuous relatively thin layer of conducting material on the top surface thereof exposing portions of the insulating plate, said top wall having a plurality of parallel slots therethrough, each of said slots exposing a region of conducting and insulating areas of predetermined pattern, said conducting areas in each of said exposed regions corresponding to a code symbol, a movable electrical contact adapted to fit into any of said slots and to engage successive strips of conducting and insulating material when moved the length of said slots, said top wall being of thickness such that the slots act as a guide for the movable electrical contact to retain the latter in each of the slots as it is moved the length of the latter, means for supplying electric current to said contact and means electrically connected to said contact through said conductive pattern for producing a signal as said contact engages the successive conducting strips exposed by said slots, said hollow casing having front, rear and side walls depending therefrom and a plate covering the base of said casing, said base plate having a cut out portion adjacent the front wall of said casing, a plate hinged to the front edge of said cut out and movable to extend beyond said front wall in substantially the same plane as said base plate, and a key mounted on said hinged plate and electrically connected to said signal producing means.

2. The combination set forth in claim 1 in which the free edge of said hinged plate is movable into the casing beyond the plane of said base plate and stop means limit the inward movement of said free edge.

3. The combination set forth in claim 1 in which said key comprises a fixed contact exposed on the outer surface of said hinged plate adjacent the free edge thereof, and an elongated resilient strip affixed at one end to the outer surface of said hinged plate adjacent the hinged edge thereof, the free end of said strip being spaced from said plate and positioned over said fixed contact.

4. The combination set forth in claim 3 in which said strip has a knob affixed to its free end and the inner end of the cut out portion has a semi-circular cut out to accommodate said knob.

5. The combination set forth in claim 1 in which said key comprises a fixed contact exposed on the outer surface of said hinged plate adjacent the free edge thereof, and an elongated resilient strip affixed at one end to the outer surface of said hinged plate adjacent the hinged edge thereof, the free end of said strip being spaced from said plate and positioned over said fixed contact, said strip has a knob affixed to its free end and the inner end of the cut out portion has a semi-circular cut out to accommodate said knob, the free edge of said hinged plate is movable into the casing beyond the plane of said base plate and stop means limit the inward movement of said free edge, said key being inwardly of the plane of the base plate when the free edge of said hinged plate is against said stop means.

References Cited in the file of this patent

UNITED STATES PATENTS

| 400,141 | Stone | Mar. 26, 1889 |
| 1,035,257 | St. John | Aug. 13, 1912 |
| 1,354,389 | Gernsback | Sept. 28, 1920 |

FOREIGN PATENTS

| 455,007 | France | May 9, 1913 |
| 129,774 | Great Britain | July 24, 1919 |